Dec. 13, 1955

L. E. VAN BLARICOM ET AL 2,727,029

ADSORPTION OF LIGNOSULFATE FROM SOLUTION
WITH POROUS ION EXCHANGE RESIN

Filed June 1, 1951

REPRESENTATION OF DESORPTION PROCESS

FIG. 1a

COLUMN DURING EARLY
STAGE OF REGENERATION

FIG. 1b

COLUMN DURING LATER
STAGE OF REGENERATION

INVENTORS
*Lloyd Eugene Van Blaricom
Kenneth Russell Gray
Frank Gordon Ward*
BY
ATTORNEYS Dec. 13, 1955 L. E. VAN BLARICOM ET AL 2,727,029
ADSORPTION OF LIGNOSULFATE FROM SOLUTION
WITH POROUS ION EXCHANGE RESIN
Filed June 1, 1951 3 Sheets-Sheet 2

FIG. 3

United States Patent Office 2,727,029
Patented Dec. 13, 1955

2,727,029

ADSORPTION OF LIGNOSULFATE FROM SOLUTION WITH POROUS ION EXCHANGE RESIN

Lloyd Eugene Van Blaricom, Kenneth Russell Gray and Frank Gordon Ward, Shelton, Wash., assignors to Rayonier Incorporated, Shelton, Wash., a corporation of Delaware Application June 1, 1951, Serial No. 229,316

12 Claims. (Cl. 260—124)

This invention relates to the treatment of lignosulfonate-containing solutions or liquors, and provides an improved process for the adsorption of lignosulfonate from such solutions by a porous insoluble resin.

More particularly, the invention provides for the adsorption of lignosulfonates from lignosulfonate-containing solutions by a porous insoluble resin in which the effective groups capable of ion exchange reactions are phenolic hydroxyl groups. The invention further provides for the regeneration of the resin with alkali to yield a lignosulfonate solution free from sugars and other organic impurities.

While the invention is applicable to the separation or recovery of lignosulfonate from any solutions containing the same, it is advantageously applicable to solutions or liquors derived from the digestion of wood. The lignosulfonate-containing solutions resulting from the acid sulfite digestion of wood are, by reason of their availability and composition, most amenable to treatment according to the invention, and the invention will be described with specific reference to such liquors. The term "acid sulfite waste liquor," or simply "sulfite waste liquor," as used herein, means: (1- the raw acid waste liquor containing free sulfur dioxide and the pulping base cations, (2) acid liquor which still contains the pulping base cations but from which free SO2 has been removed as by steam stripping, and (3) acid sulfite waste liquor from which both free SO2 and the pulping base have been removed in other operations.

In accordance with an advantageous embodiment of the invention, we separate lignosulfonate free from the sugars and other undesirable constituents of sulfite waste liquors in a practical and economical process, and recover an improved lignosulfonate product. The process of the invention may be integrated advantageously with the recovery of heat and inorganic pulping chemicals in a cyclic soda-base sulfite pulping chemical recovery operation.

The invention provides soluble lignosulfonate salts substantially free from sugars and other undesirable constituents of the waste liquor. Such purified materials are advantageous, both for use based on the colloidal properties of lignosulfonates and for use as base materials in the prepartion of simpler aromatic organic chemicals from lignosulfonates.

The process of the invention provides for discharge of all effluents into inorganic chemical recovery systems for either soda-base acid sulfite pulping, or for two-stage pulping employing acid sulfite prehydrolysis. With these cyclic processes, an additional object is to provide through such integration a high degree of economy in the isolation of lignosulfonate, and to eliminate any pollution problems connected with the recovery of lignosulfonates.

In the acid sulfite pulping process, a lignocellulose material is generally cooked in a solution of sulfurous acid, part of the sulfurous acid being combined as bisulfite. The cation combined thus with the bisulfite ion is generally known as the "pulping base" and is used in this sense herein. Pulping-base cations normally used include calcium, sodium, ammonium and magnesium.

In a more complete form, the invention provides firstly for an optional step of steam stripping sulfite waste liquor to recover free sulfur dioxide, treating either raw or stripped liquor with a phenolic adsorbent resin of the type hereinafter more fully described, removing the lignosulfonate adsorbed on the resin by converting the free phenolic hydroxyl groups in the resin to salt form with an alkaline solution, and removing the excess alkali from this regeneration effluent solution by treating it with a cation exchange resin in hydrogen form. This cation exchange resin in hydrogen form may most simply be a succeeding portion of a single bed of the phenolic hydroxyl type resin containing adsorbed lignosulfonate which has not yet been contacted by the NaOH regenerant and which is thus still in the hydrogen form. Alternatively there may be used a separate bed or column of cation exchange resin—e. g. a bed of carboxylic acid type resin in hydrogen form. In any event there results a solution of sodium lignosulfonate relatively free from sugars and other contaminating organic materials.

In its most complete form, the invention provides for integration of the process with cyclic systems for recovering pulping chemicals and heat in soda-base acid sulfite pulping or in two-stage pulping wherein a soda-base acid sulfite digestion is followed by alkaline pulping. Such integration provides the utmost in economy of operation and eliminates pollution problems. Recovery systems for soda-base sulfite pulping or two-stage pulping with which the process of the invention may be very readily integrated are those described in United States Letters Patent of Kenneth Russell Gray, Hartzell Lance Crosby, and John Charles Steinberg, 2,675,297, and copending applications of Kenneth Russell Gray and Hartzell Lance Crosby, Serial Nos. 174,102, 174,103, and 174,104, now letters patents 2,656,244, 2,656,245, 2,656,249.

As used herein, the term "lignosulfonate" refers to the lignosulfonate anion whether it be present in salts such as the sodium, calcium, magnesium, ammonium, potassium or other salts or whether present as free lignosulfonic acid.

Previous methods for the isolation of lignosulfonate from sulfite waste liquor have involved tedious dialysis procedures or cumbersome precipitation processes requiring extensive settling and filtration operations. There is a need for a simple process for recovering potentially valuable lignosulfonates. Our invention provides such a process in that, with the exception of contacting with the adsorbent resin, it may be carried out as a solution phase process requiring only simple liquid handling equipment and is well adapted to automatic controls.

As regards adsorption from solutions containing electrolytes, cross-linked resins containing phenolic hydroxyl groups have previously been considered to act only as cation exchange resins. Further, the resins only exhibited such cation exchange adsorption properties at a pH of about 10.5 and higher.

We have made the wholly unexpected discovery that lignosulfonate may be adsorbed from sulfite waste liquor by a porous cross-linked resin containing phenolic hydroxyl groups in hydrogen form. We further find that the adsorbed lignosulfonate material may be removed from the resin by treatment with an alkaline solution, thereby recovering lignosulfonate in substantially sugar-free condition.

The adsorption of lignosulfonate on the resin in the absence of nitrogen-containing groups is very surprising. The exact mechanism is not understood. It is known, however, that for the adsorption to take place, the phenolic hydroxyl groups must be in the hydrogen form, either as a result of prior treatment with acid or by carrying out the adsorption step under at least slightly acidic conditions. Further, it is found that the pulping-base cations, if present, (e. g., Na+, Ca++, or NH4+) are adsorbed, at least in part, as well as the lignosulfonate anion.

The mechanism appears to involve molecular adsorption of lignosulfonic acid or lignosulfonate salt molecules by phenolic hydroxyl groups present in the resin in the hydrogen form. Evidence for believing that the adsorption of lignosulfonates is not due to true ion exchange and does not involve the ionizable sulfonic acid groups of lignosulfonate molecules includes the following:

1. During the adsorption of lignosulfonate, there is substantially no pH change in contrast to the considerable pH change which would be expected from the adsorption of lignosulfonic acid on an anion exchange resin.

2. If metal salts of lignosulfonic acid (rather than free lignosulfonic acid) are present in the acid sulfite waste liquor treated, then an appreciable amount of the metal ions attached to the sulfonic acid groups is adsorbed along with the lignosulfonate ion.

One possibility to explain the molecular adsorption of lignosulfonates by the phenolic hydroxyl groups of the resin is that the adsorption occurs as a result of hydrogen bonding of the hydrogen in the phenolic hydroxyl groups to carbonyl or other oxygen containing groups in the lignin. This mechanism would explain the fact no appreciable pH change takes place during the adsorption since ionic groups in the lignin would not be involved.

Another possibility is that the phenolic hydroxyl group adds on a molecule of lignosulfonate salt or lignosulfonic acid by oxonium salt formation. This mechanism would be somewhat similar to the adsorption of acids by addition to anion exchange resins of the trivalent nitrogen type, the difference being that with the phenolic resins of the invention, lignosulfonate salt rather than free acid is adsorbed at least in part.

Whatever the actual mechanism, with the exception that pulping-base cations, if present, are adsorbed in addition to lignosulfonate anions, porous cross-linked resins containing phenolic resins act in the process of the invention to give a similar result to anion exchange resins. The similarity to use of anion exchange resins applies not only to the adsorption of an acid anion under acidic or neutral conditions but also to the removal of the adsorbed material from the resin by alkaline solutions.

Actually, however, a purer lignosulfonate product may be obtained than would be readily obtained by ion exchange. This is because the adsorption on the phenolic resin does not depend on ionic groups in the lignin, thus affording a separation from the smaller amounts of non-ligneous acidic materials present in sulfite waste liquor. (With an anion exchange resin some non-ligneous acidic material would tend to be adsorbed along with the lignin.)

We have made a further discovery that if the process of the invention is applied to adsorption of lignosulfonates from calcium base sulfite waste liquor on the phenolic resin and later desorption by sodium hydroxide, the sodium lignosulfonate is not appreciably contaminated by calcium. The explanation is that while calcium is adsorbed on the resin along with lignosulfonate the calcium is retained on the resin during the desorption of lignosulfonate by sodium hydroxide. It is later removed by the sulfurous acid or other acid regenerant.

While ion exchange, in the conventional sense does not appear to be involved in the adsorption of lignosulfonate, ion exchange is, however, definitely involved in the desorption of lignosulfonates by alkaline solutions. Such desorption involves conversion of the phenolic hydroxyl groups from the hydrogen form to the salt form (e. g., to Na phenolate groups). With the conversion of the free phenolic hydroxyl groups to phenolate groups, the adsorbed lignosulfonate is no longer bound to the resin and dissolves in the adjacent solution.

For brevity, the porous cross-linked resins containing phenolic hydroxyl groups used in the invention are hereinafter referred to as "porous ion exchange resins of the phenolic hydroxyl type." This in nowise implies that the adsorption of lignosulfonate necessarily occurs by ion exchange. It is considered, however, that the term "ion exchange resin of the phenolic hydroxyl type" adequately describes the resins used in the invention since:

1. This type of resin, as used in other processes, would normally be described as an ion exchange resin of the phenolic hydroxyl type.

2. Ion exchange is definitely involved at least in the regeneration of the resin, firstly by alkaline solution and secondly by SO2 or other acid.

Waste sulfite liquor, as it is obtained from the pulping digesters, normally contains appreciable quantities of free SO2. It might be thought that it would be first necessary to remove this by steam stripping in order to prevent SO2 being adsorbed simultaneously with the lignosulfonate. We have made the very surprising discovery, however, that without any such pretreatment to strip off SO2, contamination of the adsorbed lignosulfonate product does not occur, since the free SO2 in the solution is essentially not adsorbed on the resin during the adsorption of lignosulfonate.

It may, however, in some cases be desirable to strip the liquid prior to treatment with the resin for the recovery of SO2 for economic reasons and because of the fact that removal of SO2 raises the pH considerably (e. g., from less than 2 to about 4) to a point where there will be less tendency for corrosion of ordinary stainless steel by the liquid and consequently also less tendency for contamination of the product by iron.

An additional unexpected advantage is that porous ion exchange resins of the phenolic hydroxyl type will adsorb lignosulfonate without the necessity of first removing the pulping-base cations from the liquor. From an economic standpoint, this is a most important discovery since the removal of all pulping-base cations from waste liquor would involve treatment with a strongly acidic cation exchange resin in hydrogen form. This would not only involve expense from the standpoint of acid regeneration of such a strongly acidic resin, but would involve considerable expense connected with handling a corrosive regenerant (e. g., H2SO4), a corrosive regeneration effluent, and a strongly acidic solution resulting from removal of the pulping-base cations from the sulfite waste liquor (possibly having a pH of about 1).

In one preferred method of operation, sulfite waste liquor containing the pulping-base cations (which, if stripped, is only moderately acid—e. g., pH about 4) is treated with a porous ion exchange resin of the phenolic hydroxyl types whereby lignosulfonate is adsorbed, the pH changing very little. The ability of phenolic hydroxyl type ion exchange resins to function is a wholly unexpected result.

While we do not limit the invention to the mechanism described above, we believe that the phenolic hydroxyl groups in the resin may function in this novel manner in part by reason of the polyfunctionality and high molecular weight of the lignosulfonate which is adsorbed, the polyfunctionality being due to a plurality of groups having an affinity for the phenolic hydroxyl groups.

In any event as a result of our discovery, it is possible to eliminate any preliminary cation exchange step to replace the pulping-base cations in the sulfite waste liquor with hydrogen ions and also, if desired, to eliminate any preliminary step to strip the liquor of free SO2. This results in a very simple process. The sugars and other undesirable nonionic organic constituents are not absorbed in our process and can hence be separated in a single step from the adsorbed lignosulfonate.

Under the preferred operating conditions of our invention, we find it advantageous to treat the resin with an excess of sulfite waste liquor and to thus absorb on the resin only a part of the lignosulfonate component. While it is possible to carry out the resin treatment so as to adsorb the entire lignosulfonate component of the waste liquor this requires using a large ratio of resin to liquor. In order to attain the maximum capacity of the resin, it is more practical to use an excess of sulfite waste liquor, since sulfite waste liquor is either of no value, or, if it is used for a heat and chemicals recovery system, the effluent from the resin treatment may be added to this system for recovery of heat and inorganic chemical values.

Use of an excess of sulfite waste liquor is also advantageous in that a fractionation of the lignosulfonate itself may be effected. The fraction recovered by adsorption of the resin will in general be the fraction most effective for uses based on adsorption properties, e. g., for uses in tanning, dispersing, etc.

The adsorbed lignosulfonate is eluted from the resin by the use of an alkaline solution and if the elution is carried out according to the preferred aspect of our invention, the lignosulfonate can be recovered in this step with no excess of alkali. Sodium hydroxide is the preferred eluting agent, though sodium carbonate, potassium hydroxide or carbonate or ammonium hydroxide may be used.

Figure 1A:
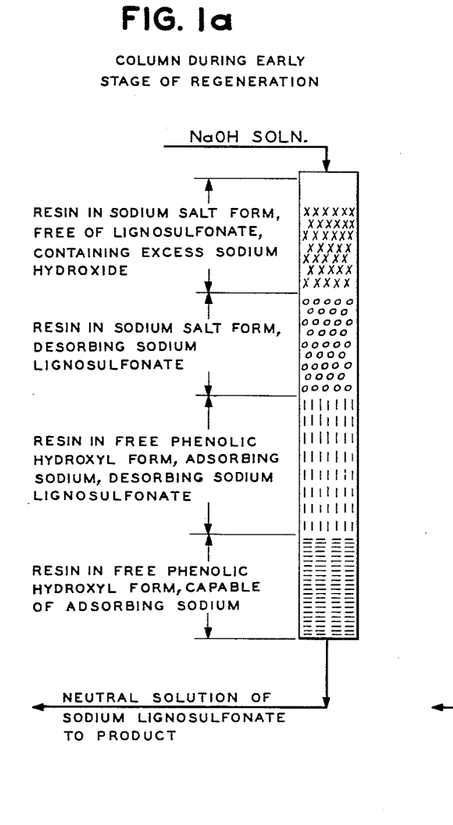
Figs. 1A and 1B illustrate diagrammatically two stages in the desorption operation of the invention.
Figure 1B:
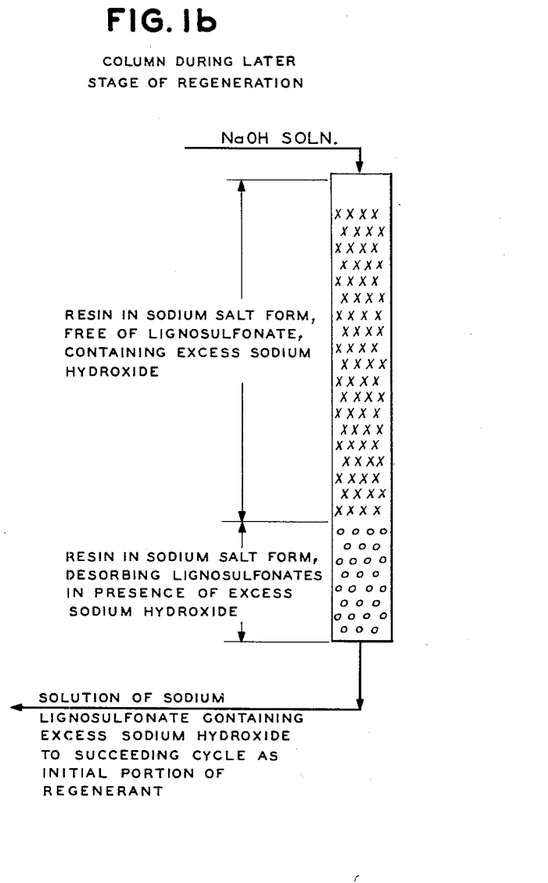
Figure 2:
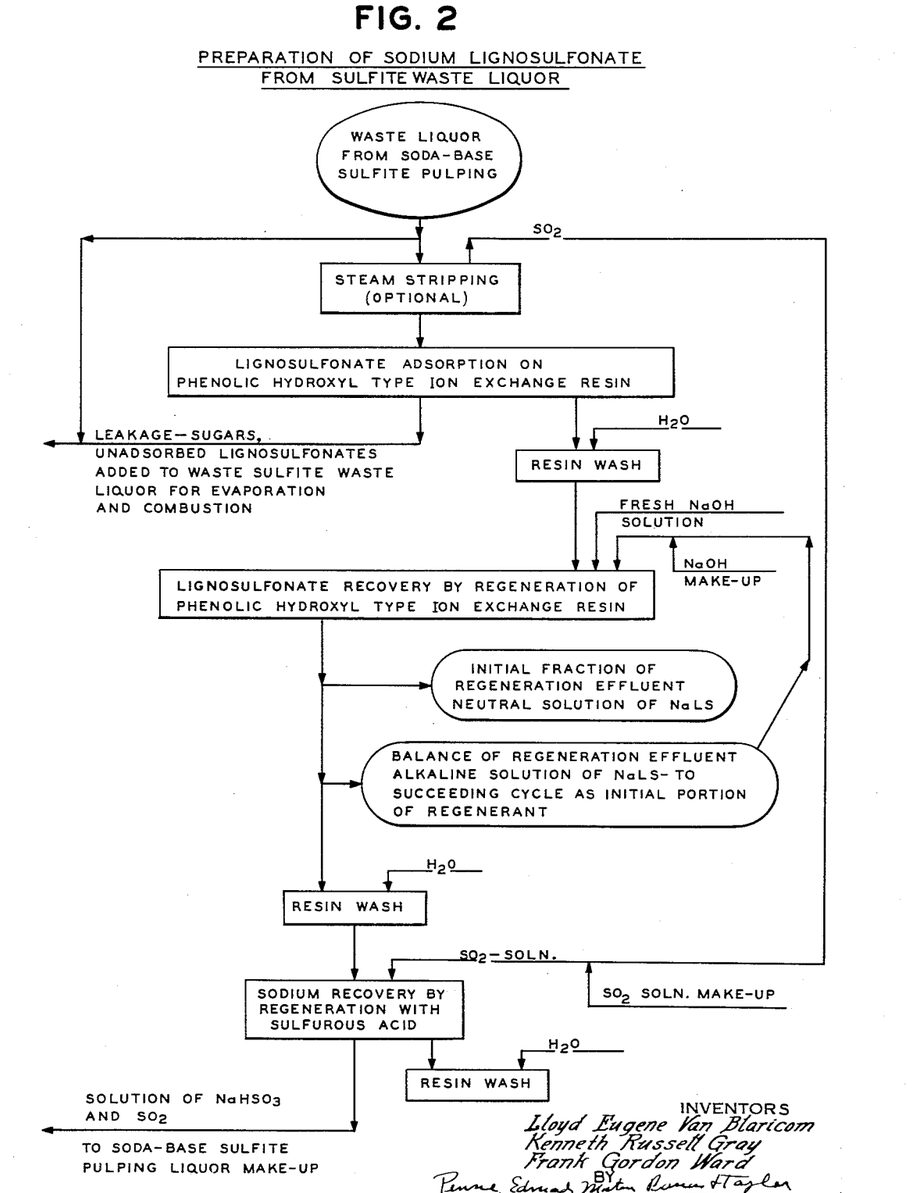
Figs. 2 and 3 are flow-sheets illustrating more complete operations of the invention.

The invention in its broadest form will be better understood by reference to the diagrams of Figs. 1 and 2. Sulfite waste liquor (e. g. from calcium or sodium-base pulping) which may, if desired, be first steam stripped to recover sulfur dioxide is treated with a porous adsorbent resin in which essentially the sole groups capable of ion exchange reactions are phenolic hydroxyl groups. The effluent or "leakage" from this treatment contains essentially all the sugars originally contained in the liquor, and the unadsorbed lignosulfonates. The resin containing adsorbed lignosulfonate is treated with an alkaline regenerant such as sodium hydroxide, thereby removing the adsorbed lignosulfonate and resulting in a solution of lignosulfonates substantially free from nonionic organic components of the waste liquor. We have also discovered that a substantial portion of this regeneration effluent contains no excess alkali and can therefore be concentrated by evaporation and used without further treatment. The remainder of the regeneration effluent will contain excess alkali and the balance of the adsorbed lignosulfonate, which can be used, after restoring the original concentration of alkali, as an initial portion of the regenerant in the succeeding cycle, and hence operate in a countercurrent fashion.

We have also discovered that the resin, after regeneration with alkali, can be treated with a sulfurous acid solution to remove the adsorbed cations and restore the phenolic groups to the hydroxyl form for the next cycle. The effluent from this step will be a bisulfite-sulfurous acid solution whose cations will in large part be that of the alkali used as regenerant, and which can be used as a source of cooking acid for the acid sulfite digestion of wood.

If all the regeneration effluent resulting from the removal of lignosulfonate from the phenolic resin with alkali is taken as product, rather than recycling a portion of it, the resulting solution of lignosulfonate will contain appreciable excess alkali.

We have also found that this excess alkali can be removed from the solution by treating the solution with a cation exchange resin in hydrogen form. While any chemically stable cation exchange resin may be used, we have discovered that if a cation exchange resin of the carboxylic acid type (rather than the sulfonic acid type) is used, the excess alkali can be removed, and the resin can be easily regenerated into the hydrogen form with sulfur dioxide solutions. The bisulfite-sulfurous acid solution produced here may also be used as a source of cooking acid for the acid sulfite digestion of wood. This is advantageous economically as well as from the standpoint of eliminating any disposal problem for the effluent.

It is also an important feature of the discovery that use of a carboxylic acid type resin, rather than a sulfonic acid type, to remove excess alkali results in almost complete removal of calcium without the necessity of an expensive step to remove all cations other than hydrogen from the solution. (Removal of calcium by removing all cations other than hydrogen, rather than by selective removal, would be very undesirable since it would produce a very acid lignosulfonic acid solution of a pH less than 2, which would be corrosive and would tend to quickly pick up heavy metals from pipes and metallic containers.)

Our use of carboxylic acid resins provides a simple method for selectively removing calcium. This is of importance for such uses as the preparation of tanning agents and dispersing agents for certain uses.

Treatment of the resin with the sulfite waste liquor and regenerant solutions may be mechanically accomplished in a number of ways, as, for example, by passing the solutions through a column or bed of the resin. This type of operation wherein the solutions are passed through a fixed bed of resin is hereinafter termed "column operation."

Again, the anion exchange resin may be treated with the solution involved in slurry form, generally with stirring. Such slurry treatment may be effected either batchwise or by a continuous addition of the resin to a stream of liquor, later separating the resin from the solution by mechanical means. Such operation involving a slurry, either in batch or continuous treatment, is hereinafter termed "slurry operation."

Generally, in order that the resin will exhibit the highest effective working capacity and in order that regeneration will be most efficient, it will be preferred to treat the adsorbent resin with the solutions in a countercurrent manner. This is especially the case as regards the regeneration step. Such countercurrent operation may be achieved most simply and conveniently by use of a column rather than by use of a multiplicity of slurry stages.

Washing steps following either the adsorption or regeneration steps may be carried out in a manner familiar to the art whereby a strong and a weak fraction is recovered, the strong fraction being added to the effluent from the step preceding the wash and the weak fraction being stored for the first wash liquor in the subsequent cycle.

In that the exchange process may be carried out in effect as an all solution phase process, it is well adapted to automatic control. The adsorption and regeneration steps and washing operations between these steps may all readily be carried out automatically using conventional control devices such as timing, metering, level control and pH control devices.

The concentration of waste sulfite digestion liquor processed in the invention is not critical. It will, however, frequently be convenient to use sulfite waste liquor of digester strength (e. g. about 8–16% total solids). This liquor being of low viscosity is readily handled with satisfactory flow and a minimum of pressure loss in the columns while still providing sufficient solids content for economical operation.

In the regeneration of the resin, the volume of alkaline solution used and the concentration of alkali in it will depend somewhat on the mechanical conditions used in regeneration—e. g., whether regeneration is carried out as a countercurrent or a slurry operation. The total amount of alkali used in the regeneration, however, should be at least equivalent to the capacity of the resin for the cation in the alkali used for regeneration. With caustic soda solution as regenerant, we find it very practical to carry out regeneration in a countercurrent manner and to use an appreciable excess of caustic soda in order to rapidly effect as complete a regeneration as possible and then to take off a fraction of the regenerant effluent which will be practically free from excesses of caustic soda, and to recycle the balance of the regeneration effluent which contains considerable excess caustic soda. Such regeneration effluent containing excess caustic soda is satisfactory for use in making up fresh caustic soda regeneration solution in that the presence of a substantial amount of lignosulfonate does not effect the regeneration materially. The absolute concentration of caustic soda in the regeneration solution used is not critical, and we frequently find it convenient to use concentrations of the order of 2% to 10% sodium hydroxide.

In order to attain the maximum ultimate capacity of the resin in the adsorption and complete regeneration, it would be necessary to use much longer times of contact in both adsorption and regeneration steps than would be necessary when treating solutions of simple inorganic ions. While such times for the ultimate in the adsorption and desorption of lignosulfonate may be of the order of one or more hours, for practical operation it will generally suffice to use lower times. We frequently use contact times in adsorption and regeneration of the order of 5–30 minutes.

The process of the invention itself will, in its various modifications, generally produce a relatively dilute solution of sugar-free lignosulfonate (e. g. most generally containing less than 15% lignosulfonic acid). This solution may be used as such for many purposes. Where, however, the product is to be shipped any distance for further use, it will be advantageous to concentrate it by evaporation. This may be done in a manner similar to those methods normally used for concentrating sulfite waste liquor itself. Thus, by multi or single stage evaporation, a viscous concentrated solution of sugar-free sodium lignosulfonate (e. g. about 40–60% sodium lignosulfonate) may be produced. Alternatively the product solutions from the ion exchange process may be concentrated to a suitable degree by evaporation and then dried to produce a powdered product by conventional drying means such as spray drying, drum drying, vacuum drying, etc. From the standpoint of improved color, it is advantageous to evaporate down a solution of pH about 5 rather than a neutral or slightly alkaline solution.

Ion exchange resins are in general porous, cross-linked polymeric materials which contain ionizable groups throughout the resin which are capable of exchanging one ion for another. They may be thus considered to be solid gel structures of an ionic nature.

The process of the invention is not limited to any particular manner of preparation of the porous phenolic hydroxyl type ion exchange resins used. Some methods whereby ion exchange resins of the phenolic type may be prepared follow:

Phenolic hydroxyl-type ion exchange resins may be prepared by polymerizing phenols (or polyphenols) to give a porous cross-linked polymer, as, for example, by use of suitable amounts of formaldehyde. Naturally occurring tannins provide an economically attractive source of polyphenols for this purpose. Alternatively, phenolic hydroxyl groups may be produced in naturally occurring polymeric materials not containing appreciable amounts of this group by such means as hydrolysis of phenol-ether or phenol-ester groups in the original molecule. Again, in such cases where necessary to obtain insolubility, prior, concurrent, or subsequent cross-linking will be effected.

A specific example of a phenolic hydroxyl type ion exchange resin which may be used in the invention is a phenolformaldehyde cross-linked polymer which has been condensed in alkaline solution and then dried and cured in such a manner as to preserve the porous gel structure. A batch of suitable resin of this type was prepared as follows:

One mol of phenol and 2.45 mols of HCHO were mixed together, and 2 grams of NaOH dissolved in 68 cc. of $H_2O$ were added to the mixture. The resultant mixture was then heated in a glass vessel under reflux at a temperature of 94° C. After 2 hours of heating, the resin set to a white opaque gel and in this form it was heated one hour longer at the same temperature to improve its structure and strength. A small amount of liquid synerized from the gel which was removed by light washing with $H_2O$. The gel was then placed in a bomb and heated at 120° C. for one hour to complete the resin condensation. Substantially no shrinkage occurred in the resin after formation of the gel; and the final product after drying by subjection to heated air at a temperature of 45° C., was a whitish, solid, light, porous body.

A commercial resin containing phenolic hydroxyl exchange centers (sold as a color adsorbent under the trade name of Duolite S30) has also been used satisfactorily in the practice of the invention.

For an ion exchange resin to be effective in any exchange process, in addition to having suitable exchange groups (phenolic hydroxyl groups), it must be porous to the molecules concerned in the adsorption—in our process to lignosulfonate molecules. As used in the claims of this application, the term "porous" means porous to lignosulfonate molecules.

For an ion exchange resin with a given type of exchange group (e. g. the phenolic hydroxyl group), it is possible to have different degrees of porosity, generally according to the degree to which the resin is cross-linked. For any type of ion exchange resin there will generally be an optimum amount of cross-linkage. With very low amounts of cross-linking, the resins will be highly porous but the resins will generally be so weak or will swell so highly as to be unsuitable for practical use. With very high degrees of cross-linking the resin particles while having good dimensional stability may have too low porosity to permit adsorption of ions. The optimum will therefore represent a compromise between these two conditions.

It is possible to determine the absolute porosity of ion exchange resins by means of surface area measurements. Such measurements, however, are exceedingly complex and the procedure is not well adapted for use as a routine check of the suitability of the physical properties of the resin for our process. We find it more practical and convenient to select resins with the type of exchange group known to be effective (phenolic hydroxyl groups) in the molecular adsorption process and to judge whether the resin is porous by determining whether it will adsorb lignosulfonate molecules under conditions which are standard, simple and readily reproducible.

The following procedure may conveniently be used to determine in this manner whether a resin is sufficiently porous to be useful in our process:

Approximately 200 ml. of stripped sulfite waste liquor is passed through a column of 17 mm. diameter which contains 100 ml. of wet, regenerated resin at a flow rate of approximately 3.5 ml. per minute. The column is then washed with water until the effluent is colorless and the effluent and washings are combined. The resin is regenerated by passing 100 ml. of 5% NaOH through the column at a flow rate of approximately 2 ml. per minute, followed by a water wash. The regeneration effluent and washings are then combined.

The estimation of the amount of lignosulfonate acid taken up by the resin can most simply be based on the fact that lignosulfonate ion has a very strong and characteristic absorption of light in the ultraviolet wave lengths. By determining on this basis the concentration of lignosulfonic acid in the original solution and that in the combined regeneration effluent and washings, the amount of lignosulfonate (as lignosulfonic acid) adsorbed on the resin is given by difference.

A convenient procedure for determining lignosulfonic acid in solution for such resin testing or for determining lignosulfonic acid in solutions at any stage of the process of the invention is given below. This method is applicable to either the original sulfite waste liquor or to intermediate or final solutions of the adsorption process containing the lignosulfonate ion.

Ultraviolet absorption measurements are made on lignosulfonate-containing solutions with a spectrophotometer (conveniently a Beckman spectrophotometer using 1 cm. quartz cells and a hydrogen arc lamp as a light source). The solutions are diluted with distilled water to a known volume such that an optical density reading is obtained which is within the range of the instrument, and the optical density is determined at a wave length of 232.6 millimicrons. The concentration of lignosulfonic acid is then determined by use of the following expression:

$$c = \frac{\text{optical density}}{41.8}$$

where $c$ is the concentration of lignosulfonic acid in grams per liter. The concentration of lignosulfonic acid in the undiluted solution can then be calculated from this value.

The constant 41.8 given in the formula has been determined empirically using a highly purified sample of lignosulfonic acid from sulfite waste liquor from hemlock wood. In order to determine absolute yields of lignosulfonic acid from liquors from different sources, it may be necessary to redetermine this constant for each type of liquor used.

As outlined heretofore, an alternate feature in the operation of our invention is the use of a cation exchange resin containing carboxyl groups to remove excess alkali from the lignosulfonate eluted by caustic soda solution from the phenolic hydroxyl type resin. The process of the invention is not limited to any particular manner of preparation of the carboxylic acid type ion exchange resin used. Some methods whereby satisfactory weakly carboxylic acid type resins may be prepared follow:

Carboxylic acid type resins may be prepared by polymerizing or co-polymerizing unsaturated organic acids or their anhydrides under conditions whereby cross-linked polymers are formed. Alternatively, esters of unsaturated organic acids may be polymerized to form a cross-linked resin and later saponified. Again, noncross-linked alkali-soluble polymers containing carboxyl groups may be subjected to a cross-linking reaction to prepare an insoluble ion exchange resin. Again, carboxylic acid groups may be introduced into natural polymers not already containing these groups. In some cases where necessary to obtain insolubility, prior, concurrent or subsequent cross-linking treatment would be effected. Introduction of carboxylic acid groups would be effected by such means as substitution of carboxyl-alkyl groups or by partial oxidation of the original structure.

A specific example of a carboxylic acid resin which may be used in the invention is a maleic anhydride-styrene copolymer which has been cross-linked by the use of divinylbenzene and hydrolyzed to the free acid form. A batch of suitable resin of this type was prepared as follows:

Ninety ml. of styrene, 60 ml. of a divinylbenzene solution containing 20–25% divinylbenzene dissolved in other aromatic carbons, 100 gms. of maleic anhydride, and 50 ml. of acetone were heated on a steam bath for a period of two hours. Temperature in the mixture rose to a maximum of 107° C. and dropped to 90° C. at the end of the two-hour period. The product was then heated in an oven at 135° C. for three hours. It was then washed thoroughly with acetone, soaked for 18 hours in 5% NaOH and then thoroughly washed with water and dried. Yield of product was 121 grams.

A commercial resin containing carboxylic acid cation exchange centers (sold under the trade-name of Amberlite IRC-50) has also been used satisfactorily for this purpose.

Fig. 2 illustrates by flow-sheet an operation of our invention in one of its more complete embodiments. The soda-base sulfite waste liquor may or may not be steam stripped to recover free $SO_2$. The stripped liquor is treated with a highly porous resin in which essentially the sole groups capable of ion exchange reactions are phenolic hydroxyl groups which adsorb preferably a portion of the lignosulfonate content of the waste liquor. The effluent from this treatment containing unadsorbed lignosulfonate and sugars is added to such other portions of the sulfite waste liquor as is being evaporated and combusted for recovery of inorganic chemicals and/or heat. The absorbent resin is washed with water and regenerated with sodium hydroxide solution.

The initial portion of the effluent from this step consists of a solution of sodium lignosulfonate which is either very slightly acid, neutral, or slightly basic, depending on how much of this portion is collected. This portion can be used as such, evaporated to a concentrated solution, or evaporated to dryness.

The balance of the regeneration effluent consists of a solution of sodium lignosulfonate containing excess sodium hydroxide, which can be used as the initial portion of regenerant in the succeeding cycle.

The resin is then washed briefly with water and regenerated again with a sulfur dioxide solution to recover the adsorbed sodium and prepare the resin for the next cycle. The effluent from this step is a solution of sodium bisulfite and sulfurous acid which can be used to furnish part of the requirements for soda-base pulping liquor in the acid sulfite digestion of wood.

The phenolic adsorbent resin is again washed and is then ready for re-use in the next cycle.

The lignosulfonate solution resulting from the above process (and which is preferably slightly acid) can be evaporated by conventional means to a concentrated solution or to a dry powder. This product is essentially free of sugars, calcium, and heavy metals, and can be used for tanning agents, dispersing agents, in ore flotation, or as the raw material for the preparation of lower molecular weight pure chemicals such as vanillin or vanillic acid.

For such uses as drilling mud additives or some other uses, a slight excess of alkali in the product will not be objectionable. In such case, the fraction of the regeneration effluent collected as product can be increased and the solution may be evaporated directly.

Figure 3:
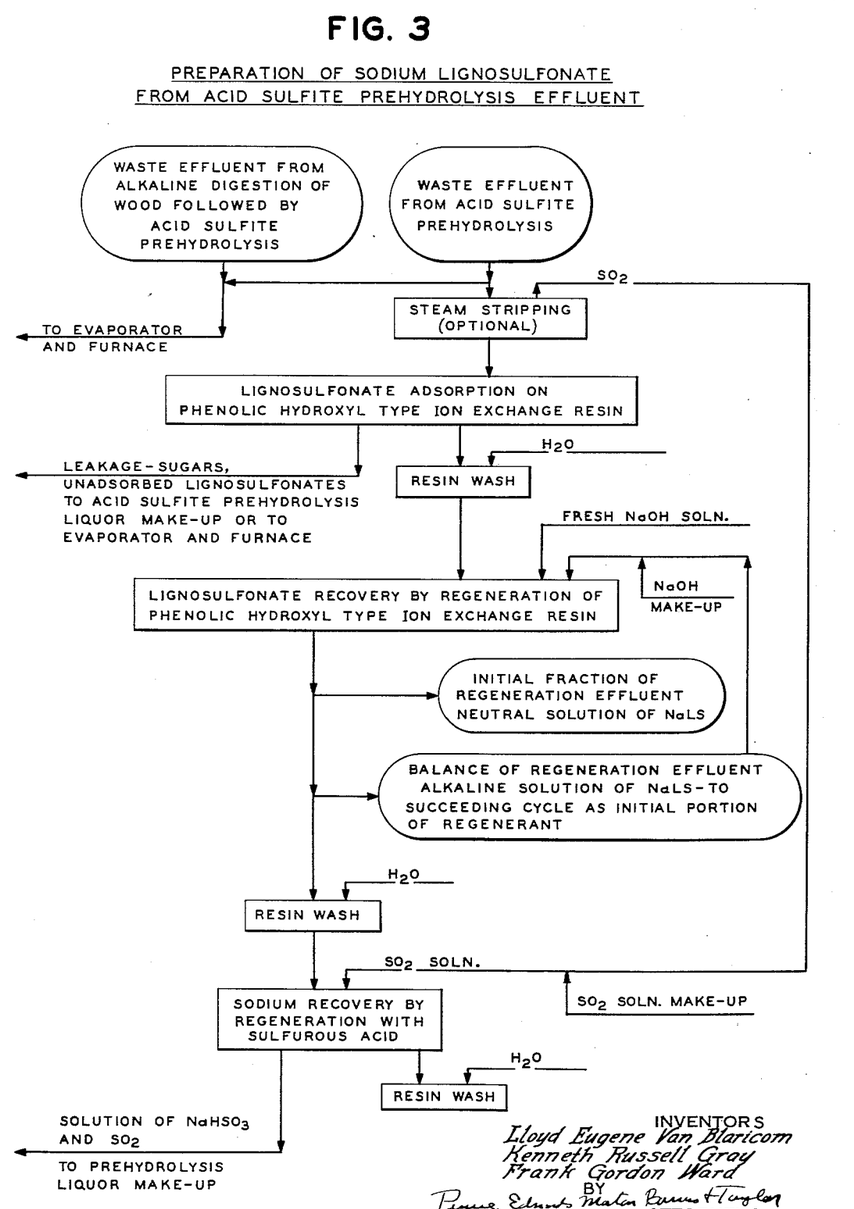

Fig. 3 illustrates another pulping operation of the invention in another of its more complete embodiments wherein lignocellulosic material (e. g. wood) is digested in one stage with a sodium-base acid sulfite solution and in a succeeding stage with an alkaline solution. The feed liquor used is the waste liquor from the first digestion of the wood with acid sulfite digestion liquor (sodium bisulfite-sulfurous acid), such waste liquor being termed in the diagram "waste effluent from acid sulfite prehydrolysis." The succeeding steps are similar to the corresponding numbered steps of Fig. 2, the only differences being:

1. In Fig. 3 the waste effluent from the ion exchange resin treatment is either: a) re-used in making up prehydrolysis liquor in view of the content of $SO_2$, or b) added to the combined waste acid and alkaline digestion liquors being evaporated and combusted for recovery of heat and inorganic pulping chemicals. (In Fig. 2 this effluent is added to the waste acid sulfite effluent which is evaporated alone and combusted).

2. In Fig. 3 the $NaHSO_3$ is used for making up acid sulfite prehydrolysis liquor rather than for making up acid sulfite pulping liquor as in Fig. 2.

Sugar-free sodium lignosulfonate recovered from waste acid sulfite prehydrolysis liquor, like the product from regular waste sulfite pulping liquor, may be evaporated by conventional means to a concentrated solution or dry powder. This product, however, as compared to that obtained from waste acid sulfite pulping liquor, is very light in color. This presents advantages for uses where color is important.

As an example of use in another pulping operation, the invention may be applied to a pulping sequence wherein lignocellulosic material (e. g. wood) is digested in one stage with an acid sulfite solution (e. g. sulfurous acid containing calcium bisulfite, ammonium bisulfite or sodium bisulfite) and in a succeeding stage with an alkaline solution containing sodium sulfite (e. g. $NaOH + Na_2SO_3$, $Na_2CO_3 + Na_2SO_3$ or a mixture of all three of these chemicals). If only the waste alkaline solution is evaporated and burned for recovery of inorganic chemicals, the ion exchange process may still be readily integrated with this pulping operation. For such integration, the sodium bisulfite produced as a by-product from the regeneration of the carboxylic acid resin column may be used to supply a portion of the make-up sodium sulfite used in the alkaline pulping digestion liquor.

If in such pulping operation the acid sulfite digestion is carried out by means of calcium-base cooking acid, and the portion of the sulfite waste liquor not used in the ion exchange lignosulfonate recovery process is simply discarded, then the unadsorbed effluent from the treatment with the phenolic resin may be similarly discarded. If, however, sodium-base pulping liquor is employed for the acid sulfite digestion and that portion not used in the adsorption process of the invention is subsequently evaporated and burned for recovery of soda salts, then the unadsorbed effluent from the treatment with the phenolic resin may be combined with the unused portion of the acid sulfite liquor which is being evaporated and burned for recovery of inorganic sodium compounds and heat.

In one of the aspects of our invention the entire regeneration effluent from the elution with caustic soda may be used directly in the production of mildly alkaline-modified lignosulfonates (referred to hereinafter also as "acid-soluble, alkaline-modified lignosulfonates") or for more drastic alkali treatment to produce by cleavage vanillin or other mononuclear products together with a highly modified and largely desulfonated lignin residue (hereinafter referred to as "alkali-modified, acid-insoluble lignosulfonates"). Use of the alkali-containing lignosulfonate solution from the alkaline regeneration of the phenolic resin directly for either mild alkali treatment, or drastic alkali treatment to produce vanillin or related materials, makes possible a two-fold use of the sodium hydroxide used in the adsorption process, i. e., as the eluting agent for removing lignosulfonate from the phenolic resin and to furnish at least part of the alkali requirement for the subsequent alkaline modification or alkaline cleavage treatment.

There are marked advantages for using the sugar-free sodium lignosulfonate of the invention, rather than sulfite waste liquor, in drastic alkaline treatments for the production of vanillin or other cleavage products. In the first place, as elsewhere pointed out, the alkali-containing lignosulfonate solution from the regeneration of the phenolic adsorbent resin may be used directly in drastic alkaline cleavage reactions thus supplying part of the alkali required for the alkaline cleavage reaction. Secondly, in that the lignosulfonate product from the phenolic adsorbent resin is substantially free from sugars, by its use rather than by use of sulfite waste liquor, there will in general be less consumption of caustic soda—by elimination of side reactions between alkali and sugars. Again, by use of sugar-free lignosulfonate as starting material, the lignosulfonate residue remaining after splitting off vanillin or related cleavage products such as vanillic acid is not contaminated by sugars or their complex degradation products and hence constitutes a much higher grade by-product. Such by-products after removal of any excess caustic soda (conveniently by ion exchange) and after removal of any heavy metal added as a catalyst in the alkali cleavage reaction, constitute very effective dispersing agents for dispersing such materials as carbon black, clays, etc. This type of lignin dispersing agent is very largely desulfonated so that it will largely precipitate upon acidification. This property is very advantageous for such uses as the dispersion of carbon black in latex since, by virtue of the acid insolubility, addition of acid to the latex serves to co-precipitate both rubber and carbon black. Such co-precipitation produces a very uniform dispersion of carbon black in rubber and without the power consumption that would be required to disperse carbon black in solid rubber mechanically or by milling on rolls.

The conditions for the production of mildly alkaline-modified sodium lignosulfonate (i. e. products which are still sufficiently sulfonated to remain soluble on acidification) are very mild as compared to those used in alkaline cleavage reactions for the production of vanillin, vanillic acid, etc. This is particularly the case as regards the proportion of sodium hydroxide to lignin used. Thus to improve the tanning or dispersing properties, sodium lignosulfonate, either as the product eluted from the phenolic resin or after subsequent treatment with a cation exchange resin, is heated with aqueous alkali under relatively mild conditions. The conditions to improve the properties by such treatment are not critical. We have used quantities of sodium hydroxide ranging from 0.2 to 3.0 times the quantity of lignosulfonate present and temperatures of from 80° C. to 150° C. For the particular conditions of caustic soda concentration and temperature used, a reaction time is chosen so that the desulfonation will stop short of the point where there will be appreciable acid insolubility.

Following heating the lignosulfonate solution with alkali as described above, excess alkali is removed with a cation exchange resin of the carboxylic type in the manner described previously. The product may be then evaporated to a concentrated solution or dry powder as desired.

Many attempts have been made in the past to employ sulfite waste liquor products as tanning agents with very little success, even though the calcium in the liquor is replaced with sodium or other suitable cation.

We have found, however, that the sodium lignosulfonate prepared by the process of the invention has improved tanning properties over the sulfite waste liquor from which it is prepared. Whereas calfskin tanned with sulfite waste liquor, treated only to replace calcium by sodium, was very dark in color and hard and brittle (i. e., not "leathered"), calfskin which was tanned with sodium lignosulfonate prepared by the process of the invention was definitely "leathered" and much lighter in color. A still further improvement can be made by alkali modifying the sodium lignosulfonate produced as heretofore described. Calfskin which was tanned with the alkali modified sodium lignosulfonate was tan in color and had a firm but pliable feel.

We have also found that the sodium lignosulfonate prepared by the process of our invention is an excellent dispersing agent for solid materials such as clay, pigments, etc. Very small quantities are capable of imparting a tremendous viscosity reduction to dispersions of high solids content which would ordinarily be pastes, but which in the presence of the product of our invention, are freely flowing fluids. A product such as this is of importance for use in such dispersions as oil well drilling muds, pottery clay dispersions, printing inks, and similar uses. In view of the substantial absence of sugars and low content of heavy metals and other impurities, the products of the invention will find especially advantageous application in such dispersing uses where presence of the usual impurities of sulfite waste liquor would be objectionable.

In order to further illustrate the process of the invention, specific examples are given below. These are not intended to limit the invention to the specific conditions given but are merely illustrative of the process which may be used in practicing the invention.

*Example 1*

A glass column with a 3-inch inside diameter was partially filled with a porous resin containing phenolic hydroxyl groups (Duolite S–30) in the hydrogen form so that the volume occupied by the resin in the wet, backwashed condition was three liters. Six liters of 5% sodium hydroxide solution was then passed through the column and the column was then washed with water. Twelve liters of 1% hydrochloric acid was then passed through the column after which it was thoroughly washed. 5640 ml. of sulfite waste liquor which had been steam stripped to remove any free sulfur dioxide was passed through the column during the course of one hour. The column was then washed thoroughly and regenerated with six liters of 5% sodium hydroxide solution. The column was again washed and the regeneration effluent and washings were combined. The combined solution was then stirred with sufficient quantity of a cation exchange resin of methylene sulfonic type (Duolite C–3) in the hydrogen form to lower the pH of the solution to 5. The resin was then filtered off and the solution was evaporated to dryness under vacuum at 50° C. to 60° C. 129 gms. of product resulted with the following analysis, based on moisture free material.

| | Percent |
|---|---|
| Total sulfur | 5.6 |
| Sulfate sulfur | 0.23 |
| Sodium | 5.15 |
| Calcium | 0.08 |
| Iron | 0.05 |
| Lignosulfonic acid by U. V. adsorption | 98.0 |
| Reducing sugars | 2.44 |
| Methoxyl | 11.55 |

*Example 2*

A quantity of the phenolic resin Duolite S–30 was placed in a glass column and regenerated as described in Example 1 with sodium hydroxide followed by hydrochloric acid. After rinsing the resin thoroughly with water, and settling, the resin occupied a volume of 3000 ml. Then 2980 ml. of unstripped sulfite waste liquor was then passed through the column over a period of one hour and the resin was then rinsed thoroughly with water. 6000 ml. of 5% NaOH was then passed through the column followed by a water rinse and a total of 4500 ml. of effluent was taken as a product. This fraction contained 83.9 gms. of sodium lignosulfonate calculated as lignosulfonic acid and contained no free sodium hydroxide or sulfur dioxide (either free or combined as sulfite or bisulfite salts). 10,200 ml. of additional effluent were collected and contained an additional 15 gms. of sodium lignosulfonate calculated as lignosulfonic acid together with considerable excess sodium hydroxide. 8000 ml. of sulfurous acid solution containing 4.15% $SO_2$ was then passed through the column, followed by a water rinse. 9500 ml. of effluent were collected, this solution containing 0.725% $SO_2$ combined as the bisulfite salt, and 1.3% $SO_2$ as free sulfurous acid.

We claim:

1. A process for the separation of lignosulfonate from a lignosulfonate-containing solution which comprises treating a lignosulfonate-containing solution at a pH not exceeding 7 with a porous resin containing phenolic hydroxyl groups in the hydrogen form and adsorbing lignosulfonate on said resin.

2. A process for the separation of lignosulfonate from a lignosulfonate-containing solution which comprises treating a lignosulfonate-containing solution at a pH not exceeding 7 with a porous resin containing phenolic hydroxyl groups in the hydrogen form and adsorbing lignosulfonate on said resin, and eluting the adsorbed lignosulfonate with an alkaline solution.

3. A process for the separation of lignosulfonate from a lignosulfonate-containing waste effluent which comprises treating acid sulfite waste liquor containing the cations used as a pulping base and having a pH not exceeding 7 with a porous resin containing phenolic hydroxyl groups in the hydrogen form, adsorbing lignosulfonate on the resin, and treating said resin containing adsorbed lignosulfonate with an alkaline solution to form a lignosulfonate solution substantially free from other organic components of the waste liquor.

4. A process for the separation of lignosulfonate from a lignosulfonate-containing waste effluent which comprises subjecting waste liquor from the acid sulfite digestion of wood to steam stripping to recover sulfur dioxide, treating the stripped liquor containing the cations used as a pulping base with a porous resin containing phenolic hydroxyl groups in the hydrogen form, whereby lignosulfonate of the liquor is adsorbed, and treating said resin containing adsorbed lignosulfonate with an alkaline solution to form a lignosulfonate solution substantially free from other organic components of the waste liquor.

5. A process for the separation of a lignosulfonate fraction from a lignosulfonate-containing solution which comprises treating a lignosulfonate-containing solution at a pH not exceeding 7 with a porous resin containing phenolic hydroxyl groups in the hydrogen form, whereby a portion of the lignosulfonate content of said solution is adsorbed, and treating said resin containing adsorbed lignosulfonate with an alkaline solution to form a lignosulfonate solution substantially free from other organic components of the original lignosulfonate containing solution.

6. A process for the separation of lignosulfonate from a lignosulfonate-containing solution which comprises treating a lignosulfonate-containing solution at a pH not exceeding 7 with a porous resin containing phenolic hydroxyl groups in the hydrogen form and adsorbing lignosulfonate on said resin, treating said resin containing adsorbed lignosulfonate with an alkaline solution to recover the adsorbed lignosulfonate, collecting the portion of regenerant which collectively has a pH less than 7 to obtain a solution of alkali metal lignosulfonate substantially free from other organic components of the original lignosulfonate-containing solution.

7. In the process of claim 6, using sodium hydroxide to recover the adsorbed lignosulfonate.

8. A process for the separation of a lignosulfonate fraction of a lignosulfonate-containing solution which comprises treating a lignosulfonate-containing solution at a pH not exceeding 7 with a porous resin containing phenolic hydroxyl groups in the hydrogen form, whereby a portion of the lignosulfonate content of the liquor is adsorbed, treating said resin containing adsorbed lignosulfonate with an alkaline solution to form an alkaline lignosulfonate solution substantially free from other organic components of the original solution, treating said alkaline lignosulfonate solution with a cation exchange resin in the hydrogen form whereby alkalinity is removed.

9. A process for the separation of a lignosulfonate fraction of a lignosulfonate-containing solution which comprises treating a lignosulfonate-containing solution at a pH not exceeding 7 with a porous resin containing phenolic hydroxyl groups in the hydrogen form, whereby a portion of the lignosulfonate content of the said solution is adsorbed, treating said resin containing adsorbed lignosulfonate with an alkaline solution to form an alkaline lignosulfonate solution substantially free from other organic components of the original solution, treating said alkaline ligno-sulfonate solution with a cation exchange resin in which the active exchange centers are carboxylic acid groups in the hydrogen form whereby alkalinity is removed and calcium contamination selectively adsorbed.

10. A process for the separation of lignosulfonate from a lignosulfonate-containing solution which comprises treating a lignosulfonate-containing solution at a pH not exceeding 7 with a porous resin containing phenolic hydroxyl groups in the hydrogen form, whereby lignosulfonate of the liquor is adsorbed, separating the resin with its adsorbed lignosulfonate from the solution, treating said resin containing adsorbed lignosulfonate with an alkaline solution and forming a lignosulfonate solution substantially free from other organic components of the original solution, and treating said resin with a sulfur dioxide solution to regenerate the resin.

11. A process for the separation of lignosulfonate from a lignosulfonate-containing solution which comprises treating a lignosulfonate-containing solution at a pH not exceeding 7 with a porous resin containing phenolic hydroxyl groups in the hydrogen form and adsorbing lignosulfonate on the resin, treating said resin containing adsorbed lignosulfonate with an alkaline solution to form an alkaline lignosulfonate solution substantially free from other organic components of the original solution, heating said alkaline lignosulfonate solution under conditions sufficient to partially desulfonate the lignosulfonate without making it acid insoluble, treating said alkaline lignosulfonate solution with a cation exchange resin in which the active exchange centers are carboxylic acid groups in the hydrogen form whereby alkalinity is removed and calcium contamination is selectively adsorbed.

12. A process for the separation of a lignosulfonate fraction of a lignosulfonate-containing solution which comprises treating a lignosulfonate-containing solution at a pH not exceeding 7 with a porous resin containing phenolic hydroxyl groups in the hydrogen form, whereby a portion of the lignosulfonate content of the said solution is adsorbed, treating said resin containing adsorbed lignosulfonate with an alkaline solution to form an alkaline lignosulfonate solution substantially free from other organic components of the original solution, adding additional sodium hydroxide to said lignosulfonate solution, heating the resulting alkaline solution for a period of time sufficient to partially desulfonate the lignosulfonate without making it acid insoluble, treating said alkaline lignosulfonate solution with a cation exchange resin in which the active exchange centers are carboxylic acid groups in the hydrogen form whereby alkalinity is removed and calcium contamination selectively adsorbed.

References Cited in the file of this patent

UNITED STATES PATENTS

| Number | Name | Date |
|---|---|---|
| 1,640,853 | Richter | Aug. 30, 1927 |
| 1,904,170 | Richter | Apr. 18, 1933 |
| 1,948,858 | Howard | Feb. 27, 1934 |
| 2,221,282 | Champer | Nov. 12, 1940 |
| 2,320,294 | Palmrose et al. | May 25, 1943 |
| 2,392,435 | Tyler | Jan. 8, 1946 |
| 2,404,367 | Durant | July 23, 1946 |
| 2,409,861 | Hunter | Oct. 22, 1946 |
| 2,470,500 | Lawrence | May 17, 1949 |
| 2,481,768 | Mills | Sept. 13, 1949 |
| 2,541,058 | Heritage | Feb. 13, 1951 |
| 2,568,925 | Mills et al. | Sept. 25, 1951 |
| 2,594,302 | Ehrensperger | Apr. 29, 1952 |

FOREIGN PATENTS

| 519,848 | Great Britain | Apr. 8, 1940 |

OTHER REFERENCES

Ser. No. 359,575, Smit (A. P. C.), published May 11, 1943.